Figure 1:
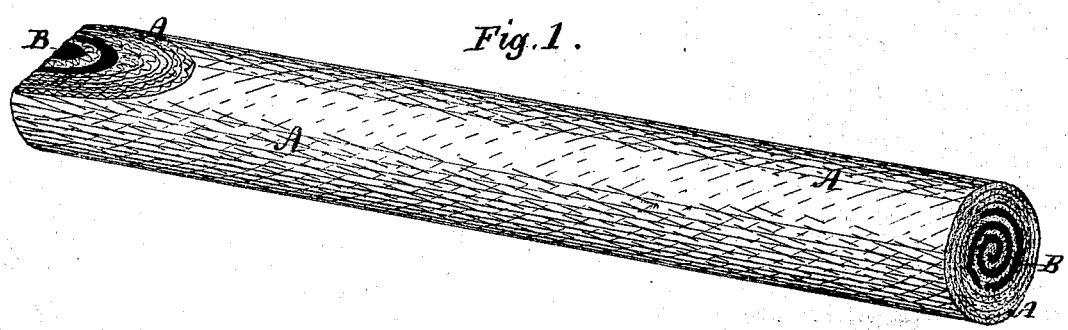

A. O. BOURN.
Steam Packing.

116671

Patented Jul 4 1871

Witnesses
Phil. F. Larner
J. Jackson

Inventor
A. O. Bourne
By Wm E. Wood
Attorney

UNITED STATES PATENT OFFICE.

AUGUSTUS O. BOURN, OF PROVIDENCE, RHODE ISLAND.

IMPROVEMENT IN STEAM-PACKING.

Specification forming part of Letters Patent No. 116,671, dated July 4, 1871.

*To all whom it may concern:*

Be it known that I, AUGUSTUS O. BOURN, of the city and county of Providence and State of Rhode Island, have invented a certain new and Improved Steam-Packing.

My invention consists of an improved core, made up of alternating layers of vulcanizable rubber and textile fabric, which, when wound to the required diameter with strips of the same fabric saturated in rubber solution, is vulcanized by the application of heat; and I do hereby declare that the following specification, taken in connection with the drawing furnished and forming a part of the same, is a clear, true, and exact description thereof.

Figure 2:
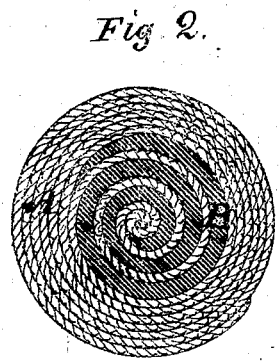

Referring to the drawing, Figure 1 represents in perspective, a piece of my packing. Fig. 2 represents a cross-section of the same on an enlarged scale.

A is a strip of textile fabric, say of cotton or hemp-canvas, cut biased. It is well saturated in a solution of rubber before being laid. B is a sheet or strip of vulcanizable India rubber, laid from the beginning with the canvas strip and alternating with it until a core of the required size is formed, when the rubber is discontinued and the canvas alone wound until the desired diameter of the packing is attained.

I am aware that rubber and canvas have been combined in many ways in the manufacture of piston and other packing; that it is not new to cut the strips of canvas biased, or to saturate them in rubber solution; and that it is not new to combine cores composed wholly of elastic rubber with successive layers of canvas. My improvement lies wholly in the novel core composed of the alternately-wound layers of elastic vulcanizable rubber and canvas.

Compared with a core composed of elastic rubber without the canvas it is found to differ as follows: It is firmer in its structure, for a line of continuity extends with the textile fabric from its very center to the periphery of the packing. The core is capable of exercising a greater resisting elastic force, for the successive layers of rubber are backed up or sustained by the intervening strips of fabric. After being vulcanized the rubber and fabric constituting the core are practically inseparable and operate as if a solid mass. While stiff and hard it is very elastic, and although it can be made to assume any desirable form on compression, it is not thereby liable to lose the power of elastic resistance.

Having thus described my invention, I claim as new and desire to secure by Letters Patent—

The improved packing described, consisting of the core formed by alternating layers of textile fabric and rubber surrounded by successive layers of the fabric saturated in rubber solution, as and for the purposes specified.

A. O. BOURN.

Witnesses:
JAMES SHAW,
ANDREW R. TROTTER.